(12) United States Patent
Kwan

(10) Patent No.: US 8,584,952 B2
(45) Date of Patent: Nov. 19, 2013

(54) APPARATUS, SYSTEM AND METHOD FOR EXTENDING THE DEPTH OF FIELD OF AN OPTICAL CODE SCANNER

(75) Inventor: Sik Piu Kwan, Suwanee, GA (US)

(73) Assignee: NCR Corporation, Duluth, GA (US)

( * ) Notice: Subject to any disclaimer, the term of this patent is extended or adjusted under 35 U.S.C. 154(b) by 693 days.

(21) Appl. No.: 12/776,851

(22) Filed: May 10, 2010

(65) Prior Publication Data

US 2011/0272462 A1    Nov. 10, 2011

(51) Int. Cl.
*G06K 7/10*    (2006.01)

(52) U.S. Cl.
USPC .............................. 235/462.32; 235/462.25

(58) Field of Classification Search
USPC .............. 235/462.23, 462.24, 462.11, 462.41
See application file for complete search history.

(56) References Cited

U.S. PATENT DOCUMENTS

| | | | | |
|---|---|---|---|---|
| 7,490,776 B2 * | 2/2009 | Thuries | .................... | 235/472.01 |
| 2006/0060653 A1 * | 3/2006 | Wittenberg et al. | ...... | 235/462.01 |
| 2007/0063043 A1 * | 3/2007 | Heinrich | ........................ | 235/454 |
| 2008/0217411 A1 * | 9/2008 | Ledwith et al. | .......... | 235/472.02 |
| 2008/0296385 A1 * | 12/2008 | Vinogradov | ............. | 235/462.22 |
| 2011/0258130 A1 * | 10/2011 | Grabiner et al. | .............. | 705/317 |

* cited by examiner

*Primary Examiner* — Thien M Le
(74) *Attorney, Agent, or Firm* — Harden E. Stevens, III

(57) ABSTRACT

An apparatus, system and method are presented for extending the depth of field of an optical code image scanner. The optical code image scanner comprises a lens and an image capture device where the lens is configured to create two distinct focal points using incoming light and the image capture device captures an image using light from the lens.

8 Claims, 6 Drawing Sheets

APPARATUS, SYSTEM AND METHOD FOR EXTENDING THE DEPTH OF FIELD OF AN OPTICAL CODE SCANNER

FIELD OF THE INVENTION

The present invention relates generally to optical code scanners. More particularly, the invention relates to an apparatus, system and method for increasing the depth of field of optical code scanners.

BACKGROUND

Optical code scanners are used in a wide variety of applications that rely on reading information stored in optical codes. Industries such as retail, airline, self-service, automotive, parcel delivery, pharmaceutical, healthcare and others use optical codes to provide inventory control, customer identification, product identification, item tracking, security and many other functions. A bar code is a type of optical code in wide use and a bar code scanner is a type of optical code scanner configured to read bar codes. A typical bar code is comprised of a number of bars separated by spaces. Information is encoded in a bar code by varying the width of the bars and spaces. When a bar code is placed within the field of view of a bar code scanner, the scanner will detect and decode the bars and spaces comprising the bar code to retrieve the information encoded wherein. This operation is also known as scanning or reading a bar code. The information encoded on a bar code is usually a sequence of numeric or alphanumeric symbols (e.g., a Universal Product Code (UPC) or European Article Number (EAN)).

The field of view for a bar code scanner is defined as a three dimensional area of space wherein the bar code scanner can reliably detect and read a bar code that passes through the area of space. The field of view for a bar code scanner has a height, width and depth dimension. The depth is commonly referred to the depth of field for a bar code scanner. It is desirable to have a large depth of field because it increases the total volume of space that makes up the field of view, which means more space can be reliably scanned for a bar code.

Bar code scanners that read bar codes by capturing and processing an image of the bar code is called an image scanner. One technique for increasing the depth of field for an image scanner is to reduce the size of the optical aperture in the scanner, however this also reduces the amount light available for capturing an image of a bar code. The reduced light intensity increases the signal to noise ratio making it more difficult to detect and read a bar code. At some point, the bar code cannot be reliably read.

Therefore, it would be desirable to provide an apparatus, system and method that among other things, provides for increasing the depth of field without the above limitations.

SUMMARY OF THE INVENTION

Among its several aspects, the present invention recognizes the advantages to having a large depth of field for an optical code image scanner. A large depth of field increases the area from where an optical code, presented for reading, can be placed so that it is reliably detected and decoded by an optical code image scanner. The invention addresses this issue by using a lens configured to focus incoming light from an optical code to two different focal points where the focused light is then captured by an image capture device for processing to detect and decode the optical code.

In addition, an aperture is used to adjust the amount of light transmitted from the optical code to the lens to take advantage of the special properties of the lens. Software, executed by a processor on the image scanner, can control the opening of the aperture and the capturing of the image. The software in some embodiments changes the size of the aperture opening and captures an image using each aperture setting in order to create the optimal conditions to detect and decode the optical code.

A more complete understanding of the present invention, as well as further features and advantages of the invention, will be apparent from the following Detailed Description and the accompanying drawings.

DETAILED DESCRIPTION

In the following description, numerous details are set forth to provide an understanding of the claimed invention. However, it will be understood by those skilled in the art that the claimed invention may be practiced without these details and that numerous variations or modifications from the described embodiments are possible.

Figure 1:
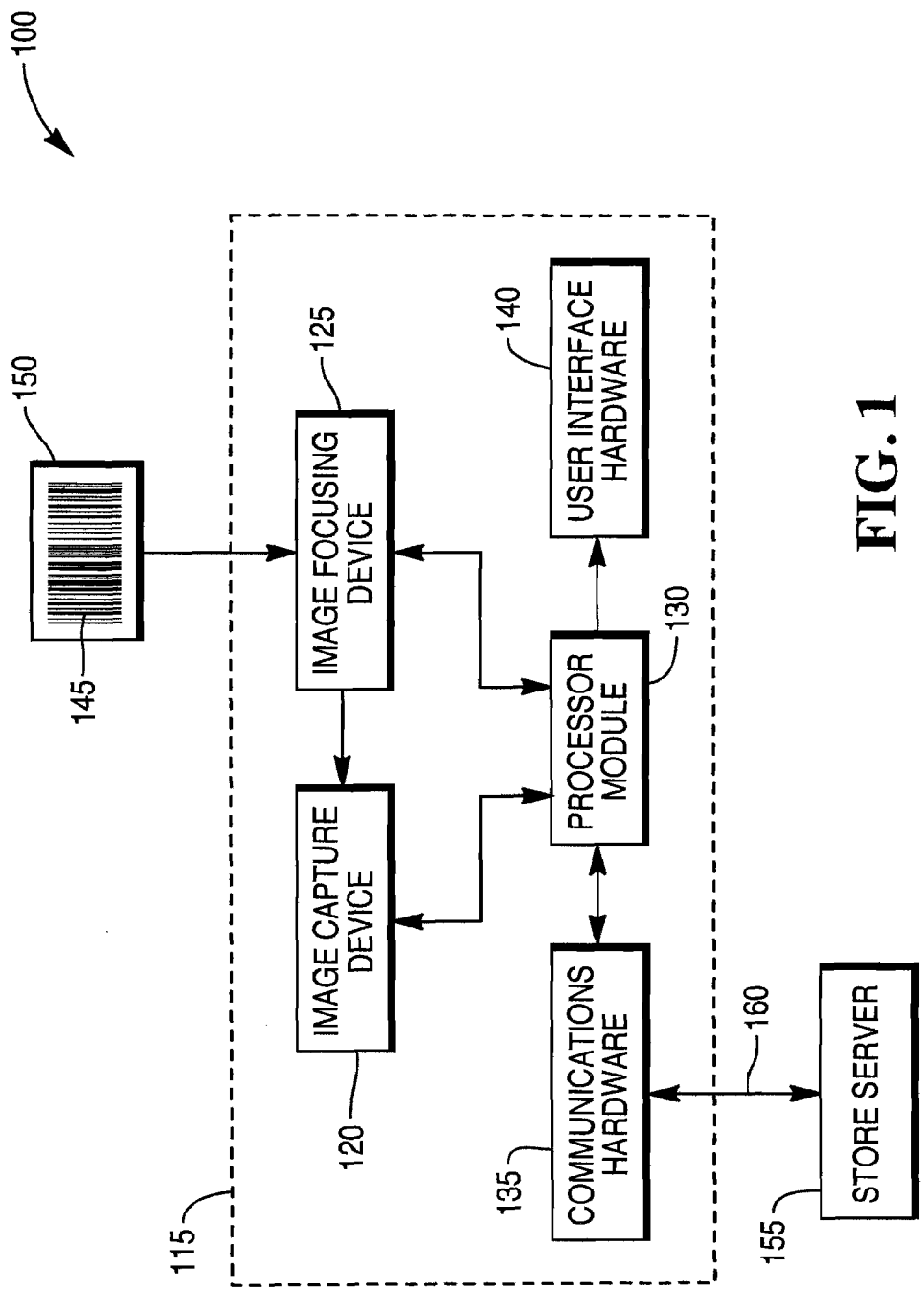
FIG. 1 is a high-level diagram illustrating an exemplar embodiment of an optical code image scanning system.

Referring to FIG. 1, there is provided a high-level illustration, in block form, of an exemplar embodiment of an optical code image scanning system 100. In this embodiment, the optical code is a bar code 145 and the optical code image scanning system 100 is configured to read bar codes 145. The image scanning system 100 comprises an image scanner 115, a store server 155 and the bar code 145 printed on a label 150. The image scanner 115 communicates with the store server 155 over a computer data network 160. The network 160 can be a wired network (e.g., an Ethernet network) or wireless network (e.g., an IEEE 802.11G based network or cellular based) or a combination of both. In some embodiments, the store server 155 is physically removed from the store where the image scanner 115 is located and communicates with the image scanner 115 over the Internet or a wide area network or a combination of these or different types of networks. In some embodiments, multiple image scanners 115 communicate over the data network 160 to the store server 155.

The image scanner 115 includes an image-focusing device 125 that receives light reflected off of the bar code 145 and focuses the received light onto an image capture device 120. The image scanner 115 is further comprised of a processing module 130, user interface hardware 140, and communications hardware 135.

The processing module 130 comprises a processor, memory, stored instructions and interface hardware to communicate with and control other devices and modules that are part of or connected to the image scanner 115. An Intel® Atom or Analog Devices® Blackfin are examples of processors that can be used in the processing module 130. The Blackfin processor also has a built-in digital signal processor to aid in processing captured images. The stored instructions include applications and system functions. The processor, in the processing module 130, executes the stored instructions to implement the features and function of the image scanner 115. This includes controlling the hardware devices and modules that comprise the image scanner 115 or are connected to the image scanner 115. In addition, the stored instructions cause the processor to process data such as an image that is captured by the image capture device 120 to detect and decode a bar code 145 and control the communications hardware 135 to implement protocols used on the data network 160. In some embodiments, the store server 155 sends the image scanner 115 updates to the stored instructions or to the operating parameters of the image scanner 115. The updated stored instructions are stored in the image scanner 115 and then executed as required.

The image capture device 120 converts light reflected from the bar code 145 into electrical signals. The source of the reflected light may be ambient light or light from an illumination device if sufficient ambient light is not available. To capture or convert the reflected light into electrical signals, the image capture device 120 uses a silicon-based device with both optical and integrated circuits that is fabricated using a complimentary metal oxide semiconductor (CMOS) process. This device is usually referred to as a CMOS sensor or more generically as an image sensor because it captures images. In some embodiments, the image capture device 120 uses a charge-coupled device (CCD) in place of a CMOS device.

The image capture device 120 captures an optical image, focused on or reasonably close to its surface, by converting the photons of the optical image to an electronic digital image comprised of pixel data that is organized into rows and columns. The pixel data is read from the image capture device 120 by the processor and analyzed to detect and decode the bar code 145.

Figure 2A:
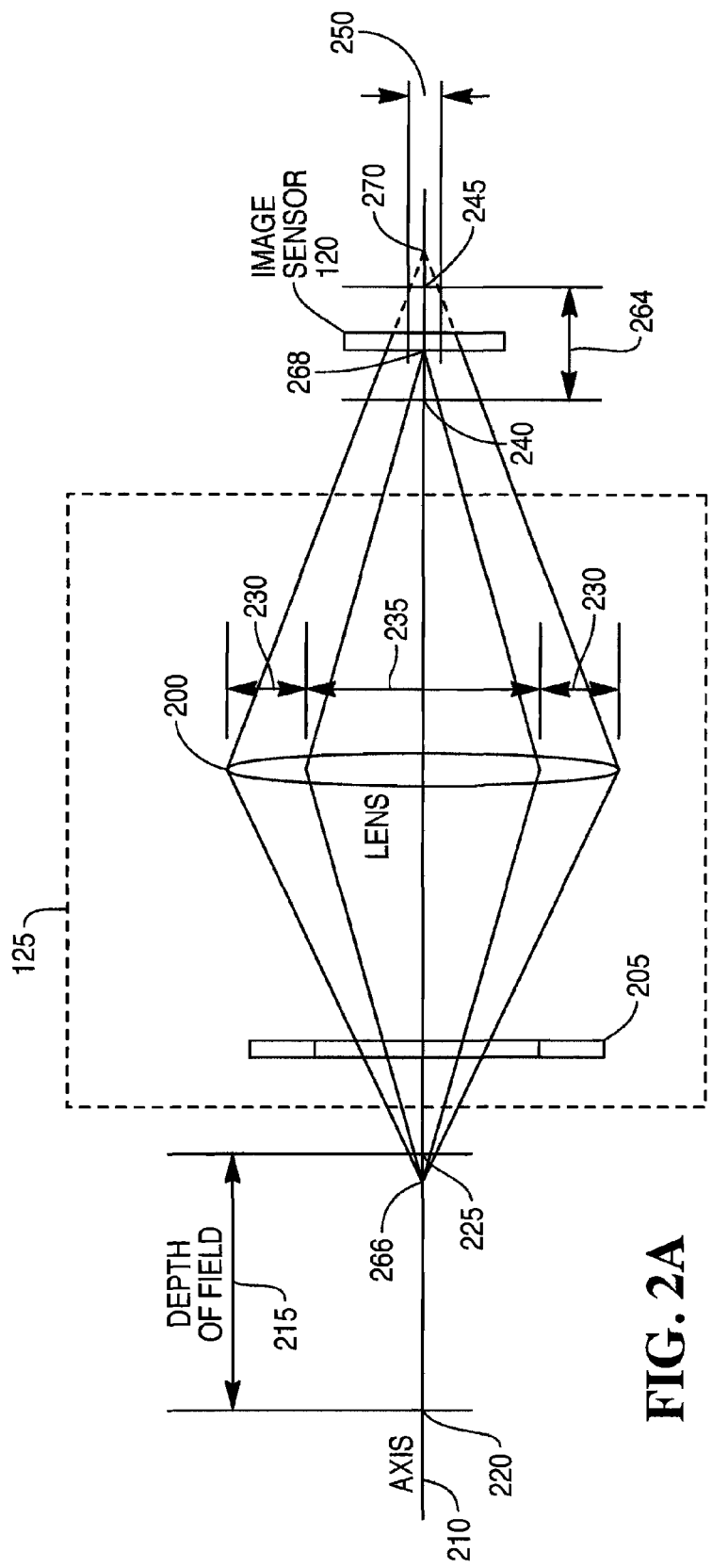
FIG. 2A is a high-level drawing depicting the focusing of light from a bar code in a first position.
Figure 2B:
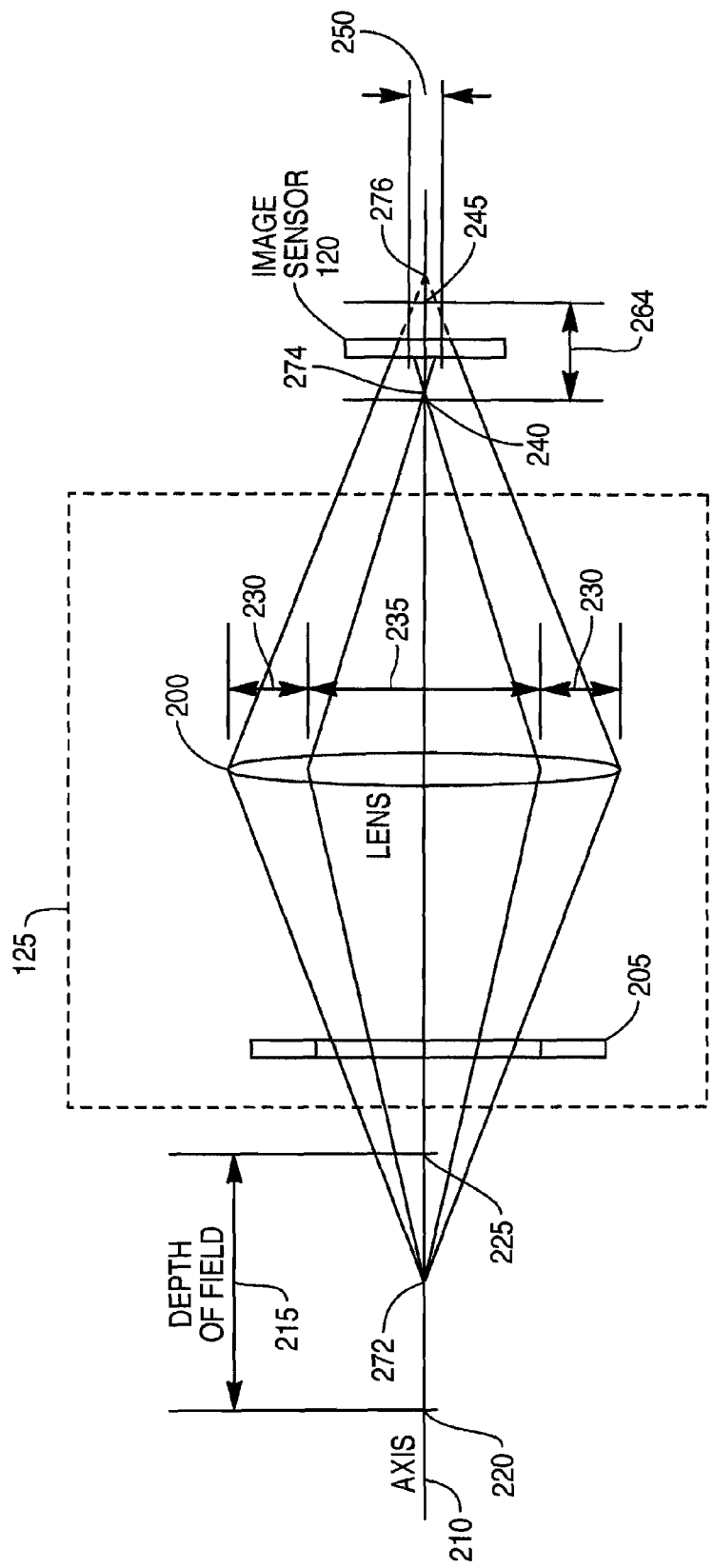
FIG. 2B is a high-level drawing depicting the focusing of light from a bar code in a second position.
Figure 2C:
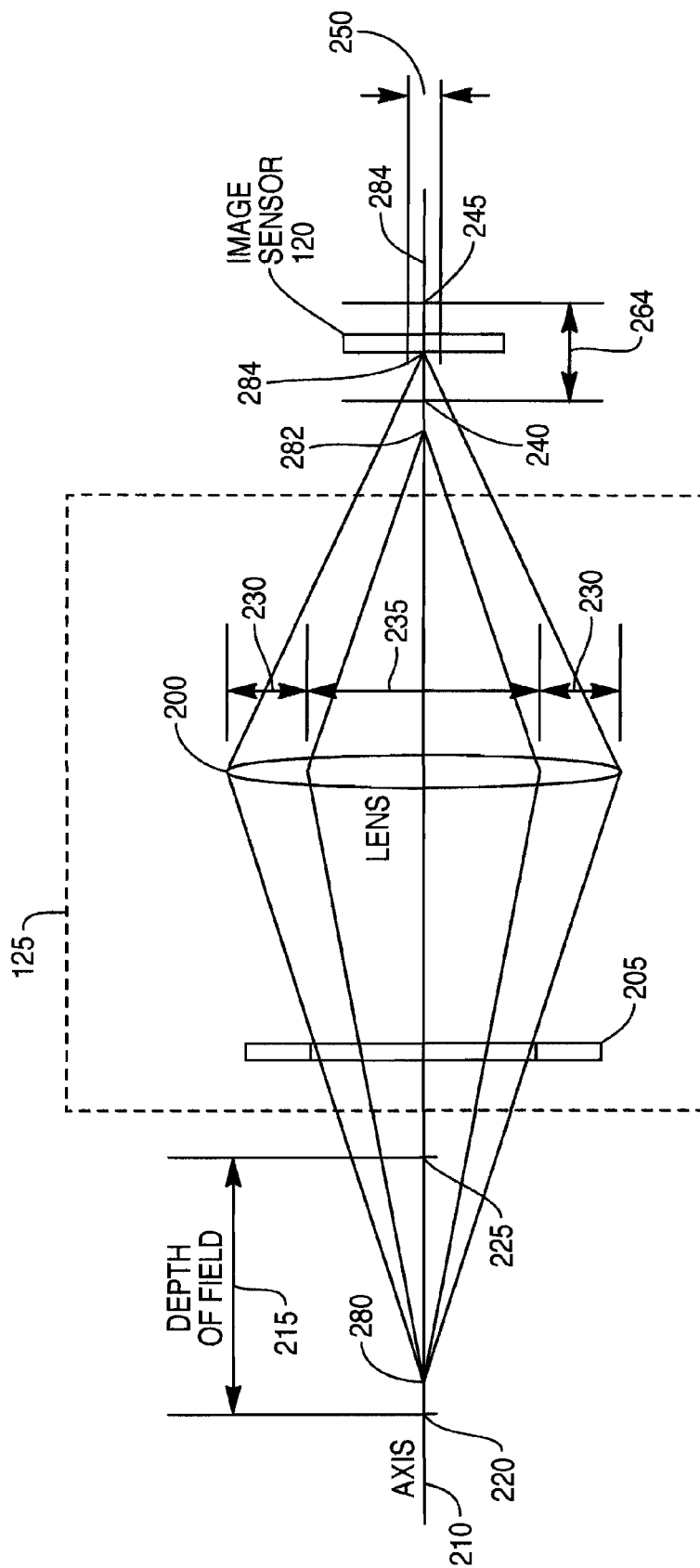
FIG. 2C is a high-level drawing depicting the focusing of light from a bar code in a third position.

Turning to FIG. 2A, there is provided a high-level drawing illustrating the focusing of light from an object located in a first position 266. FIGS. 2A, 2B, and 2C each illustrate the focusing of light from an object by the image scanner 115 where the object is located at three different locations 266 (FIG. 2A), 272 (FIG. 2B) and 280 (FIG. 2C). The object is the label 150 with the bar code 145 facing the image scanner 115. The image-focusing device 125 includes an aperture 205 and a lens 200 that are centered on an axis 210 that extends through the center of the image capture device 120. The aperture 205 governs the amount of light that is transmitted to the lens 200. The aperture 205 can be opened or closed and is controlled by software executed by the processor module 130. In some embodiments, the aperture 205 has a fixed (not movable under program control) opening that is set, i.e., during manufacturing or installation, to a predetermined size optimized for the average environment.

The image capture device 120 also has a parameter known as the circle of confusion. The circle of confusion is a circular area at a reference location where light from a lens is not in perfect focus because the reference location is some distance from a focal point of the lens. As the distance between the reference location and the focal point increases, the diameter of the circle of confusion increases when measured at the reference location. As the diameter of the circle of confusion increases, the sharpness and clarity of an image being focused decreases until the image is so out of focused it is not usable. Also, as the diameter of the circle of confusion increases, the depth of field 215 increases. It is desirable to a have a large depth of field 215 but only if the captured image is usable. Therefore, the maximum diameter 250 for the circle of confusion is determined so that any image being focused by the lens 200 has sufficient sharpness and clarity to be usable when it is captured and to also have the largest depth of field 215. A sufficient or acceptable image quality is defined as a captured image where the clarity and sharpness of the bar code 145 in the captured image allows the bar code 145 to be detected and decoded by software processing the image. The image capture device 120 is configured so that an image will be focused within the maximum circle of confusion if one of the two focal points produced by the lens 200 lies within a focal region 264 along the axis 210.

Continuing with FIG. 2A, light from the bar code 145, positioned at the first location 266, passes through the aperture 205 to the lens 200. The lens 200 has two different regions. Each region is constructed and configured to focus incoming light from the bar code 145 to a different location or focal point (a focal point can also be referred to as a focal plane) on the axis 210. In this example, the outer region 230 of the lens 200 attempts to focus light from the object located at the first position 266 to a focal point 270, which is located behind the image capture device 120. The light never reaches the focal point 270 because the focused light strikes the image capture device 120 first. The circle of confusion for the focused light from the outer region 230 is larger than the maximum diameter 250 for the circle of confusion. Therefore, the image focused from the outer region 230 is not acceptable for processing to decode and detect the bar code 145.

The inner region 235 of the lens 200 focuses light from the object, located at the first position 266, to a focal point 268, which is located in front of the image capture device 120. Since the focal point 268 is located within the focal range 264, the circle of confusion for this focused light falls within the maximum diameter 250 for the circle of confusion. Therefore, the image focused from the inner region 235 is acceptable for processing to detect and decode the bar code 145.

The depth of field 215 for the image scanner 115 is defined along and about the axis 210 between a first point 225 and a second point 220. An image of an object, in this illustration the bar code 145, located within the defined depth of field 215 will be captured with sufficient sharpness and clarity so software processing the captured image can detect and decode the object. As discussed above, the depth of field 215 is determined, in part, by the maximum diameter 250 of the circle of confusion. Since the lens 200 produces two focal points 268, 270 (in this Figure), only the image focused on one of the two focal points 268, 270 has to fall within the maximum diameter 250 of the circle of confusion for the captured image to be acceptable. It should be noted that a focused image will fall within the maximum diameter 250 of the circle of confusion if at least one of the two focal points 268, 270 (for this figure) falls within a focal range 264 defined between two points 240, 245 on the axis 210. Therefore, using a lens 200 that produces two focal points 268, 270 increases the depth of field for the image scanner 115 by allowing the image scanner 115 to detect and decode bar codes 145 over a larger range of distances (increased depth of field) than standard scanners using standard lenses.

Turning to FIG. 2B, there is provided a high-level drawing illustrating the focusing of light from an object located in a second position 272. The outer region 230 of the lens 200 attempts to focus light from the object located at the second position 272 to a focal point 276, which is located behind the image capture device. The light never reaches the focal point 276 because the focused light strikes the image capture device 120 first. The circle of confusion for the focused light is larger than the maximum diameter 250 for the circle of confusion.

Therefore, the image focused from the outer region 230 is not acceptable for processing to decode and detect the bar code 145.

The inner region 235 of the lens 200 focuses light from the object located at the second position 272 to a focal point 274, which is located in front of the image capture device 120. Since the focal point 274 is located within the focal range 264, the circle of confusion for this focused light will fall within the maximum diameter 250 for the circle of confusion. Therefore, the image focused from the inner region 235 is acceptable for capture and processing to detect and decode the bar code 145.

Turning to FIG. 2C, there is provided a high-level drawing illustrating the focusing of light from an object located in a third position 280. The inner region 235 focuses light to a first focal point 282 that is closer to the lens 200 while the outer region 230 focuses light to a second focal point 284 that is farther from the lens 200. In this illustration, the image capture device 120 is also located at the second focal point 284, which means the image focused to the second focal point 284 is clearly focused onto the image capture device 120.

Figure 3:
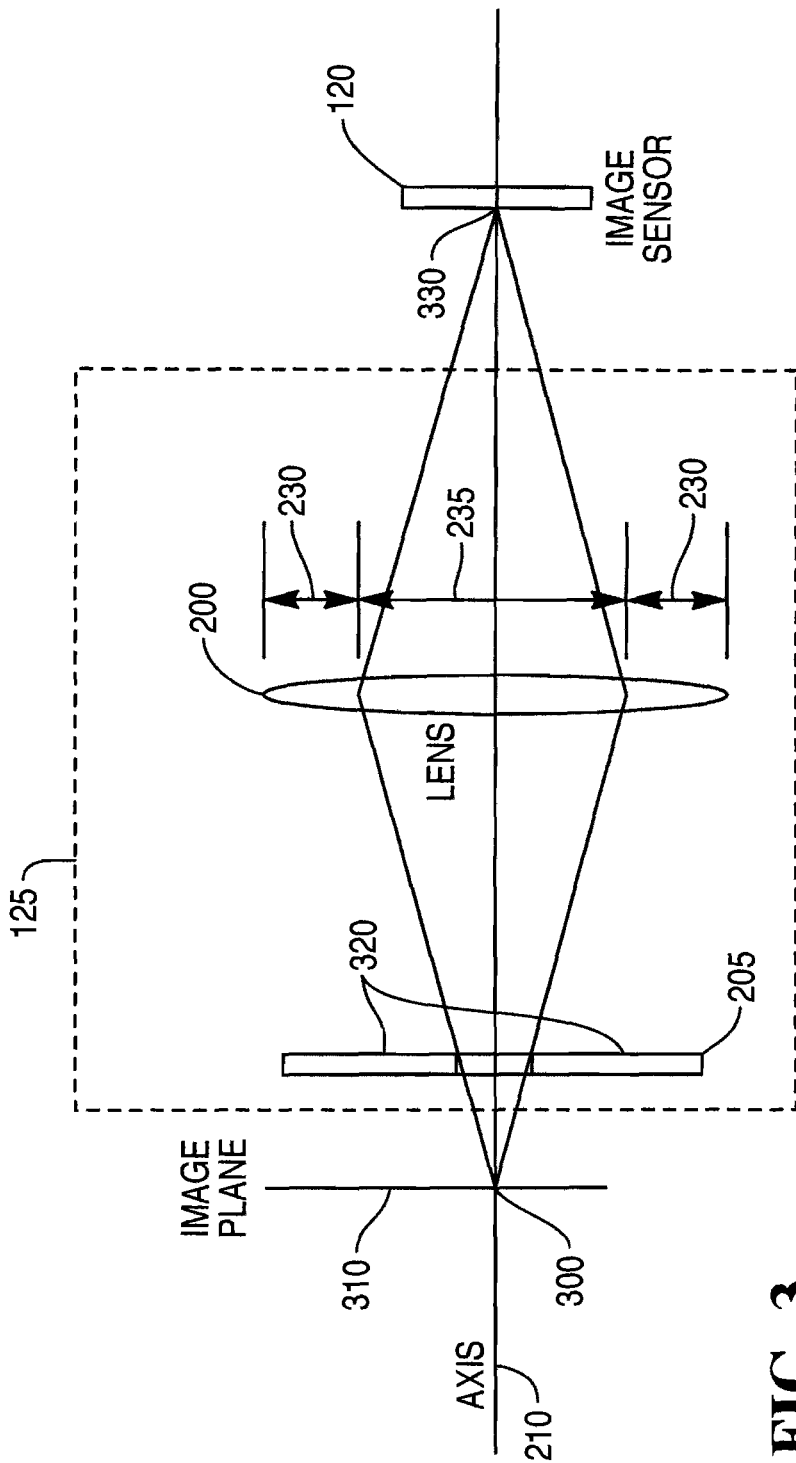
FIG. 3 is a high-level drawing depicting the operation of an aperture in the imaging focusing device.

Turning to FIG. 3, there is provided a high-level drawing illustrating the operation of an aperture in the imaging focusing device 125. In this embodiment, the aperture 205 is opened and closed under the control of software executed by the processor module 130. The opening 320 of the aperture 205 has been closed to a point where the majority of the light from an image plane 310 located at a point 300 on the axis 210 passes through the inner region 235 of the lens 200 and not through the outer region 230. This causes the lens 200 to focus all or most of the received light to single focal point 330 created by the inner region 235, instead of creating two different focal points using both the inner region 235 and the outer region 230. Not having a second focal point removes light associated with the second focal point and improves the image associated with the single focal point 330. Reducing the aperture size also increases the depth of field but it is the lens 200 that provides the largest increase to the depth of field. The aperture is not reduced to a size that causes a captured image to be unusable.

Figure 4:
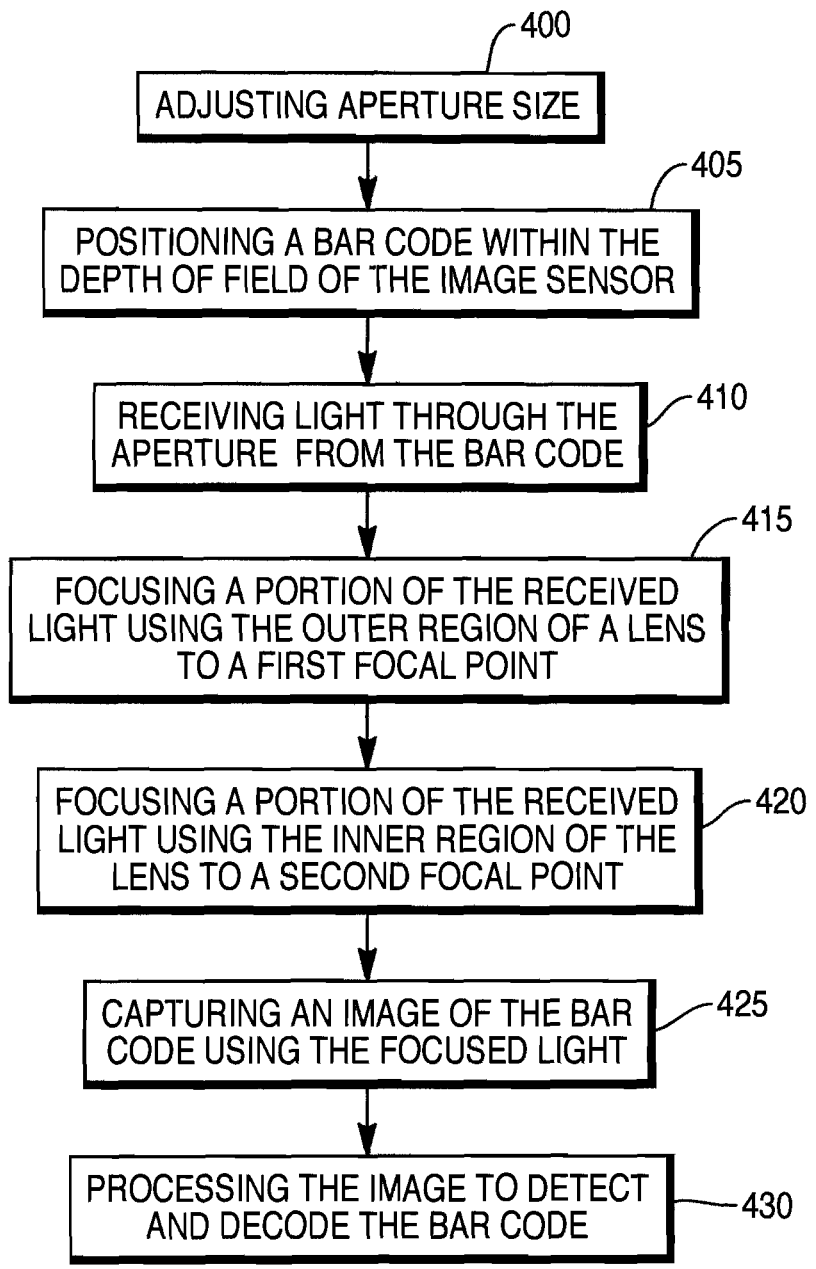
FIG. 4 is a high-level flow chart depicting an exemplary method of reading an optical code.

FIG. 4 is a high-level flow chart depicting an exemplary method of reading an optical code. Instructions executed by the processor in the processor module 130 control and process information from components of the image scanner 115 to implement this method. In step 400, the aperture 205 is adjusted to the proper size under processor control. In step 405, an optical code, in this example a bar code 145, is positioned within the depth of field 215 of the image scanner 115. In step 410, light is received from the bar code 145 and passes through the aperture 205 to the lens 200. In step 415, the outer region 230 of the lens 200 focuses a portion of the received light from the bar code 145 to a first focal point (in FIG. 2A, location 270). In step 420, the inner region 235 of the lens 200 focuses a portion of the received light from the bar code 145 to a second focal point (in FIG. 2A, location 268). In step 425, the processor causes the image capture device 120 to capture an image of the bar code 145 using the light focused by the lens 200. In step 430, the processor processes the captured image to detect and decode the bar code 145.

In some embodiments, the aperture opening is fixed and cannot be adjusted under processor control. In other embodiments, the aperture is movable but is always set by the processor to the same position e.g., at power up. In this embodiment, the aperture setting is predetermined based on for example the operating environment of the image scanner 115. In still other embodiments, the aperture is set to a plurality of different positions under processor control and an image is captured and processed at each aperture setting until the bar code 145 is detected and decoded.

In other embodiments, the lens 200 is configured to produce more than two focal points, which further increases the depth of field. However, additional focal points will also decrease the clarity and sharpness of an image, which will effectively limit the number of usable focal points.

Although particular reference has been made to an optical code image scanner used to read bar codes, certain other embodiments, variations and modifications are also envisioned within the spirit and scope of the following claims.

I claim:

1. An optical image scanner comprising:
    a processor module;
    an image capture device;
    an image focusing device comprising a lens configured to focus light, received from a single image plane located in any one of a plurality of locations, to a plurality of different focal planes at the same time where one of the plurality of different focal planes is approximate to the image capture device; and
    where the processor module directs the image capture device to capture an image of the focused received light and where the location of the one of the plurality of different focal planes approximate to the image capture device causes light from the single image plane to be focused on the image capture device within a circle of confusion for the image capture device.

2. The optical image scanner of claim 1, where the received light is from an optical code.

3. The optical image scanner of claim 2, where the optical code is a bar code.

4. The optical image scanner of claim 1, further comprising an aperture where the received light passes through the aperture and where the amount of received light is controlled by the aperture.

5. An optical image scanner system comprising:
    a network;
    a store server connected to the network where the store server communicates data over the network; and
    an optical image scanner connected to the network and comprising:
        a processor module;
        an image capture device;
        an image focusing device comprising a lens configured to focus light, received from a single image plane located in any one of a plurality of locations, to a plurality of different focal planes at the same time where one of the plurality of different focal planes is approximate to the image capture device; and
    where the processor module directs the image capture device to capture an image of the focused received light and where the location of the one of the plurality of different focal planes approximate to the image capture device causes light from the single image plane to be focused on the image capture device within a circle of confusion for the image capture device.

6. The optical image scanner system of claim 5, where the received light is from an optical code.

7. The optical image scanner system of claim 6, where the optical code is a bar code.

8. The optical image scanner system of claim 5, further comprising an aperture where the received light passes through the aperture and where the amount of received light is controlled by the aperture.

* * * * *